United States Patent [19]
Inoue

[11] 3,727,489
[45] Apr. 17, 1973

[54] DIE-MAKING PROCESS

[75] Inventor: Kiyoshi Inoue, Tokyo, Japan

[73] Assignee: IJR (Inoue - Japax Research Inc.), Midoriku, Yokohama, Japan

[22] Filed: Mar. 17, 1971

[21] Appl. No.: 125,192

[30] Foreign Application Priority Data

| | | |
|---|---|---|
| June 28, 1967 | Japan | 42/41494 |
| Sept. 2, 1967 | Japan | 42/56310 |
| Mar. 17, 1970 | Japan | 45/22543 |
| Mar. 30, 1970 | Japan | 45/26715 |

Related U.S. Application Data

[63] Continuation-in-part of Ser. No. 723,799, April 24, 1968, Pat. No. 3,591,760.

[52] U.S. Cl................................76/107 R, 219/69 E
[51] Int. Cl.............................................B21k 5/20
[58] Field of Search ....................76/107 R; 219/69 E, 219/69 M, 69 V; 72/56, 57

[56] References Cited

UNITED STATES PATENTS

| | | | |
|---|---|---|---|
| 3,445,617 | 5/1969 | Rheingold et al. | 219/69 E |
| 3,584,179 | 6/1971 | Schroeder | 219/69 M |

*Primary Examiner*—Granville Y. Custer, Jr.
*Attorney*—Karl F. Ross

[57] ABSTRACT

A die-making process using electrical-machining techniques, i.e., EDM and/or ECM, whereby a die master is first prepared having a surface configuration closely complementary to that of a desired die-surface pattern and a contour corresponding to that of the article to be produced. Upon the die-master surface and in intimate contact therewith, an electrically conductive die-facing layer is formed by electrodeposition or by a high-energy-rate-forming (shockwave-forming) system. This layer is then used as an electrical-machining electrode for machining a conductive block of backing material to impart thereto a configuration complementary to the surface of the machining electrode or the layer thereby preparing a backing body for the latter. The machined body and the layer are matingly engaged and bonded together, the surface of the layer originally in contact with the die master surface forming a desired die surface for use. The layer is, preferably, two laminated layers, formed of materials adapted for die use and for use as an electrode in the electrical-machining step.

15 Claims, 9 Drawing Figures

PATENTED APR 17 1973

Kiyoshi Inoue
INVENTOR.

BY

Karl J. Ross
Attorney

DIE-MAKING PROCESS

CROSS-REFERENCE TO COPENDING APPLICATIONS

This application is continuation-in-part of application Ser. No 723,799 filed Apr. 24, 1968 (now U.S. Pat No. 3,591,760 of July 6, 1971).

This application also relates to subject matter disclosed in my copending application Ser. No. 750,576 filed Aug. 6, 1968 (U.S. Pat. No. 3,607,689 of Sept. 21, 1971) and entitled "POWER SUPPLY FOR LARGE-SURFACE ELECTROCHEMICAL MACHINING," application Ser. No. 824,014 filed Aug. 30, 1968 (U.S. Pat. No. 3,594,299 of July 20, 1971) and entitled "APPARATUS FOR ELECTRICAL MACHINING OF METALLIC WORKPIECES," application, Ser. No. 838,575 filed July 2, 1969 (U.S. Pat. No. 3,604,884 of Sept. 14, 1971) and entitled "EDM POWER SUPPLY FOR GENERATION SELF-ADAPTIVE DISCHARGE PULSES," application Ser. No. 845,724 filed July 29, 1969 and entitled "COMBINED HYDROSTATIC AND SPARK FORMING," and application Ser. No. 850,056 filed Aug. 14, 1969 (U.S. Pat. No. 3,640,110 of Feb. 8, 1972) and entitled "SHOCK FORMING."

FIELD OF THE INVENTION

The present invention relates to a die-making process and, more particularly, to an improved technique for manufacturing a die for use in shaping materials such as in molding, die-casting, press shaping, forging, extrusion forming, stamping, trimming or compaction shaping.

BACKGROUND OF THE INVENTION

Such dies have conventionally been fabricated by several methods, all leaving much to be desired. While mechanical cutting has long been a mainstay in the die-making industry, this method is not entirely satisfactory or economical because of the fact that a die block must be a material, usually, a metal, of a hardness and other specific characteristic capable of withstanding severe working conditions and which consequently is not readily machinable by a cutting tool. Moreover, when an intricate die pattern is required, the mechanical method is often impractical or otherwise incapable of forming the die contours with suitable precision and surface smoothness in a simple manner or without requiring time-consuming and costly hand-finishing operations.

The inherent shortcomings of the mechanical method can much be obviated by using electrical-machining techniques which includes electrical-discharge machining (EDM) and electrochemical machining (ECM). In these methods, electrical energy is utilized to electrophysically (by spark erosion) or electrochemically (by electrolytic solubilization) remove material from a workpiece to be machined, without requiring mechanical cutting action. In die-making processes using electrical machining, a shaped tool electrode and a die blank are closely juxtaposed across a gap filled with a liquid dielectric or electrolyte, and an electric current is passed in the form of intermittent electroerosive discharges or electrolytic-dissolution current between the tool and the workpiece to reproduce precisely the tool shape upon the latter. While electrical machining thus greatly facilitates die-making processes and has been in extensive use in the industry where other methods are not feasible or impractical, this technique, too, is not always satisfactory as it has been used heretofore. A surface contour produced by electrical machining is often not satisfactory with respect to its accuracy and surface smoothness for immediate use as a die and may require subsequent sizing and/or polishing operations. In preparing a single die, electrical machining, especially electrical-discharge machining, also most often requires a number of identical or similarly dimensioned electrodes for replacement due to wear and, even when "no wear" machining techniques are employed, there is a need for rough and finish machining electrodes in order to complete a single die-making operation in a minimum of time to provide a die of the required surface finish and tolerances. In addition to these inconveniences, there often occurs damage to an expensive die block due to short-circuiting or thermal arching during the machining operation and this can only be eliminated or obviated by sophisticated power-circuit design.

Apart from the foregoing considerations, it is significant to note that in the prior die-making methods discussed above, removal of material from a die stock is required and consequently the cost involved in loss of material is unnecessarily high, especially where a large cavity is to be manufactured.

OBJECTS OF THE INVENTION

It is the principal object of the present invention to provide an improved die-making process capable of manufacturing a die, even of highly intricate shape, with a high precision, economically and with relatively simple steps.

Another object of the invention is to provide an improved die-making process adapted to manufacture a multiplicity of identical dies with high precision of duplication (i.e., reproducibility).

Still another object of the invention is to provide an improved die-making process whereby material cost can be sharply reduced as compared with prior-art practices.

SUMMARY OF THE INVENTION

According to the present invention, a die master is first prepared which has a surface configuration complementary to that of a die to be produced. Conveniently, the die master may be an article whose reproduction is desired by the die to be produced. Alternatively, it may be a die model shaped to closely duplicate the contour of an article whose production or reproduction is desired with a die to be produced and, to facilitate shaping, the die model may conveniently be made of gypsum, wood, plastic (synthetic resin), graphite or other material readily machinable by a cutting tool in a conventional manner. Using such a single economical die master, it has been found to be possible, according to this invention, to provide a die, even of a highly intricate pattern hitherto difficult or impractical to shape, with a high precision and surface finish to the extent that additional hand finishing is practically not required, and to provide even a number of such dies of identical configuration with an extremely high accuracy of reproduction, yet in much simpler manner and often with less material cost than with conventional die-making processes.

The present invention contemplates a novel die structure comprising a die-facing layer and a backing member therefor, which are shaped in sequence by combining conventional techniques in a unique manner and finally compounded together. More specifically, according to this process, a material selected to constitute the surface layer of a die to be produced is applied upon the die-master surface in intimate contact therewith but is removable therefrom by subsequent stripping. To this end, it has been found to be highly advantageous to use electrodeposition or a sheet-metal forming technique. This material is applied and formed in a relatively thin layer consisting of die-facing material at least along the surface region of the layer adjacent to the die-master surface.

A further feature of the present invention resides in the use of the reverse side of this relatively thin formed layer as a machining electrode surface for providing a backing member by electrically machining a relatively massive conductive block. While, as has been pointed out in connection with prior-art practices, electrical machining is not always satisfactory when directly used to form a die surface, this technique is here effectively used since it merely forms backing and support surfaces. Thus, the reverse side of the formed layer and a conductive block are closely juxtaposed to form a machining gap between them, the gap being flooded with a machining liquid or medium. An electric-machining current is passed through the gap between the layer and the conductive block to remove material from the latter while they are relatively displaced so as to maintain the machining gap generally constant. Material removal is continued until the conductive block finally becomes complementarily shaped, and thereby becomes effective to matingly receive the machining surface of the layer whose reverse-side surface was previously formed closely complementary to the die master. Finally, by firmly bonding these machining and machined surfaces together in mating engagement, a unitary or integrated die results with the precision-shaped die surface firmly supported by the backing member.

The aforementioned layer, used as the machining electrode for shaping the backing member, may wholly consist of a material required to form the surface layer of the compound die structure. Where, however, such a material is susceptible to erosion in electrical machining and such erosion or consumption is not desirable, or at any rate its direct exposure to the machining region is undesirable, the layer may consist of two sublayers, the first composed of the required die-surface material and the second composed of a material selected to constitute the machining surface. In preparing this compound and shaped layer, the die material can first be applied upon the die master surface by electrodeposition to form the first sublayer upon which the electrode material is electrodeposited or applied by other conventional techniques to form the second sublayer or the laminate having a shaped machining surface backed by the shaped first (die-facing) sublayer. Alternatively, the first and second sublayers can be prepared in a laminated sheet by electrodeposition or other technique and then pressed upon the die master, preferably using an impact-forming, high-energy-rate-forming technique.

It will be appreciated that according to the present invention a highly effective die-making process has been provided. The shaped outline of a resulting die is of exceeding accuracy and smoothness since the shaping is effected directly upon a die-master contour, and once the latter is prepared a number of such dies are obtainable much more readily than with prior techniques. Yet, as is clear, the die structure is very firmly supported due to the fact that electrical-machining principles are applied in an effective manner.

DESCRIPTION OF THE DRAWING

These and other objects, features and advantages of the present invention will become more readily apparent from the following description, reference being made to the accompanying drawing showing two embodiments and in which.

SPECIFIC DESCRIPTION

Figure 9:
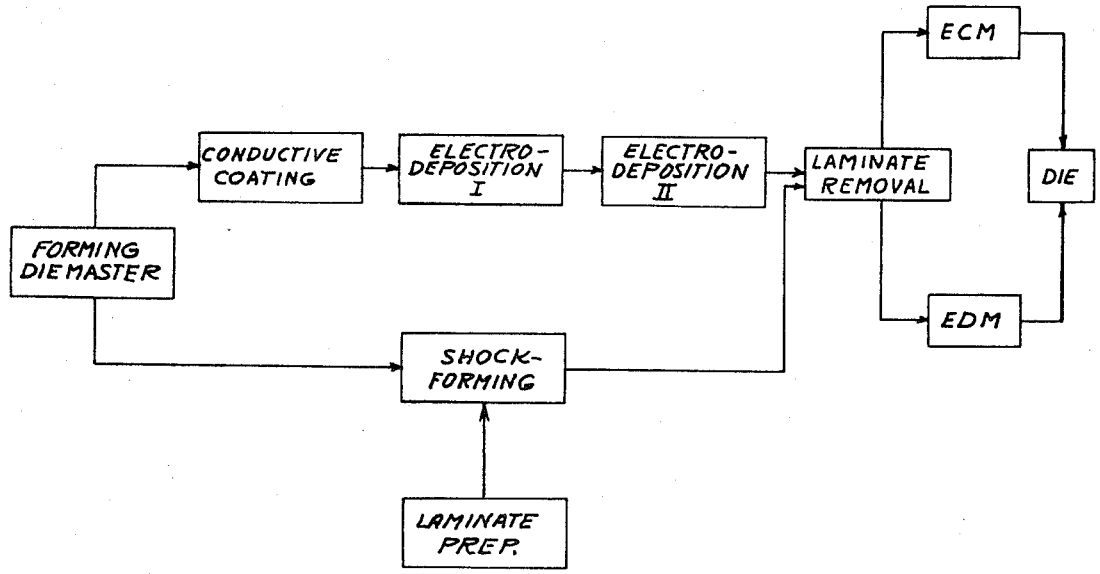
FIG. 9 is a diagram illustrative of the invention.

Referring first to FIG. 9, it can be seen that the method of the present invention comprises, as a first step, the forming of a die master, either as a specimen of the article to be produced by the finished die or as a separate contoured body having the configuration of the finished article. According to one aspect of the invention, the die master is provided with a conductive coating having a thickness of 0.1 to 1 micron and is then coated by a first electrodeposition stage with the die-facing material. The reverse side of the die-facing material, i.e., the side opposite the forming surface of the die, may then be coated in a second electrodeposition stage with an electrode material for the electrical machining of a backing body.

The electrodeposited layers thus form a laminate. The laminate may be formed alternatively by shock-forming against the die master of a previously produced laminate. The laminate may here as well be removed from the die master. It should be noted, however, that the die master in either system may remain to support the laminate when the latter is used for the electrical machining of the backing body.

The electrical machining process may consist, as represented in FIG. 9, of an electrochemical machining or electrodischarge machining of the backing body, represented respectively as ECM or EDM, in which the laminate surface opposite the die-forming surface is juxtaposed with a workpiece in the form of the backing body. When the contours of this latter electrical-machining surface are reproduced in the backing body, the laminate is set into the latter so that the electrical-machining surface is hugged by the electrically machined surface and the die is secured in a single unit.

Figure 1:
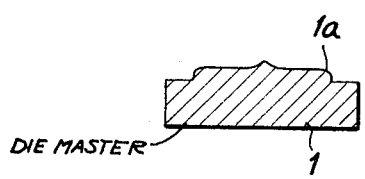
FIGS. 1 to 3 are sectional view illustrating the steps forming a die-surface material upon a die-master surface using electrodeposition.

In FIG. 1 there is shown a die master with a contoured surface 1a which can either be an article or a die model whose reproduction is desired with a die now to be produced. The die model can be conveniently composed of a material which, as mentioned before, is readily shapable with a cutting tool in a usual manner and may be gypsum, wood, graphite, plastic or the like. Upon die-master contour 1a, a material required to form the surface layer of a resultant die (die-facing layer), a material such as nickel, copper, nickel/cobalt alloy, tungsten/cobalt alloy, chromium or iron, is here electrodeposited.

Figure 2:
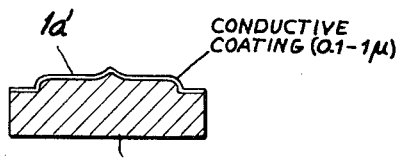

To this end, when die master 1 is composed of a non-conductive material, a very thin film of conductive material (e.g., a metal such as silver or gold or a non-metal such as graphite) 1a' is first deposited uniformly upon die surface 1a and in intimate contact therewith as shown in FIG. 2 by conventional spraying, evaporation, chemical plating, painting or a like procedure. This thin film 1a' is designed to constitute a cathode in a conventional electrodeposition system when it is brought into contact with or immersed in a plating bath which is adapted to electrolytically deposit the required die material upon layer 1a' when an electric current is passed therethrough between the latter and a juxtaposed anode. An electrodeposition system for the preparation of the die-facing layer is described at pages 201 – 203 of THE ENCYCLOPEDIA OF ELECTROCHEMISTRY, Reinhold Publishing Corp., New York, 1964. In this case the deposited material is chromium. For this purpose, a conductive layer 1a' of a thickness ranging between, say, 0.1 and 1 micron has been found to be satisfactory and desirable.

Figure 3:
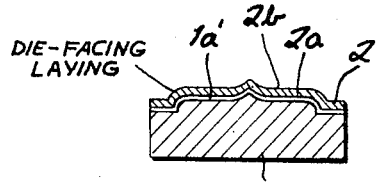

By continuing electrodeposition, a layer of die-facing material 2 of a required thickness, say, 1 to 5 mm is built up upon conductive film 1a', with its inside surface 2a being in intimate contact with the film and uniformly covering die master surface 1a, as shown in FIG. 3.

It will be apparent that conductive layer 1a' is exaggeratedly shown in Figures and, since it is very thin, its presence does not give rise to accuracy problems at resulting die surface 2a. If necessary or desired, this thin film can, of course, be stripped from the shaped layer 2 subsequently, such as by electrochemical polishing. Electrochemical polishing may be carried out as described at pages 32 – 34 of "ELECTROCHEMICAL MACHINING," edited by De Barr and Oliver, American ELSEVIER Publishing Co., New York. 1968.

It will also be noted that when die master 1 is of a conductive material, it can be used directly as a plating cathode and hence the step shown in FIG. 2 omitted.

Figure 4:
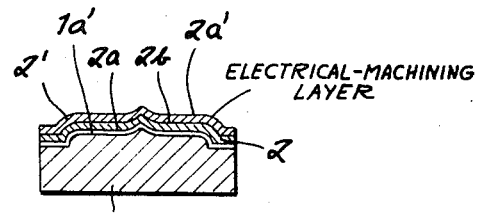
FIG. 4 is a sectional view illustrating the step of forming an electrode material upon the electrodeposited die-surface layer.

FIG. 4 illustrates the step of applying a further layer 2' upon die-facing layer 2 although this step is not necessary where the use of layer 2 as machining electrode surface is justified by its thickness and constituent material. If, however, die material 2 is susceptible to undesired electrical erosion in the subsequent step which will be described, or its direct use as machining surface is not feasible for some other reasons, this additional layer is advantageously provided. To this end, while such a method as fusion metal spraying can alternatively be employed, it is convenient and preferable to use electrodeposition here again with the same electrodeposition system that is used in the prior step while changing the electrolyte to that adapted to supply an electrode material. Further layer 2', therefore, consists preferably of an electrodeposited material which is resistant to electrical erosion in the subsequent step. A suitable system for applying the additional layer is described at pages 244 – 247 of "THE ENCYCLOPEDIA OF ELECTROCHEMISTRY" op.cit. It has been found that such a material as copper which is electrolytically built up to a thickness between 1 and 5 mm upon the first layer is highly satisfactory even where electrical-discharge machining is chosen in the subsequent step and when used with discharge parameters suitably regulated to establish "no wear" condition. It will be understood, however, that this additional layer may even be of an electrically erodable material and may be eroded if it as formed is of such an enough thickness that die-material layer 2 can be protected effectively or may be injured seriously in the course of electrical machining so as to become useless. It will also be noted in connection with FIG. 4 that while second layer 2' is shown deposited upon first layer 2 with the latter remaining upon die master 1, this deposition can also be effected after the first layer is stripped from the die master.

Figure 5:
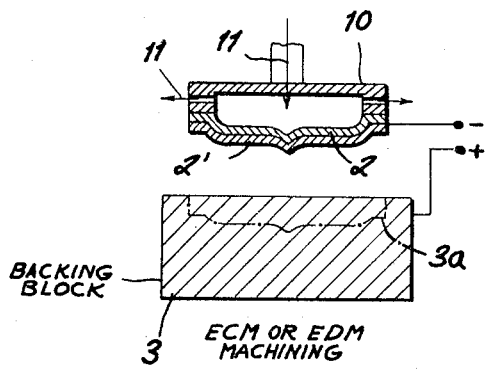
FIG. 5 is a sectional view illustrating the step of forming a backing member for the die-surface layer by electrical machining with the machining electrode surface prepared in the preceding step.

FIG. 5 illustrates the step of electrically machining a conductive block 3 with laminated layer 2/2' as machining electrode to impart thereto a surface pattern complementary to the pattern of the outer surface 2'a of this layer, and thus adapted to be a backing member for layer 2/2'. The conductive block is of some selected material such as hardened steel. This step is carried out using either electrical discharge machining or electrochemical machining or combination thereof, depending on a particular type of machining equipment available. Applying electrical machining principles here, the electrode body 2/2' which is shown removed from die master 1 previously is mounted in a suitable hold 10 and brought into close proximity of conductive block 3 which forms the counterelectrode or workpiece. In electrical-discharge machining, a dielectric liquid is utilized to fill a machining gap formed between the juxtaposed electrodes across which a succession of electroerosive discharge pulses are passed to remove material from the workpiece with or without concomitant wear of the electrode material. The electric discharge machining process may be carried out with a system of the type described in the above-identified application Ser. No 838,575 filed July 2, 1969 (U.S. Pat. No. 3,604,885 of Sept. 14, 1971) which discloses an electric-discharge machining power supply for generating a periodic self-adaptive discharge pulses with variable initiation, termination and interval timing. The basic elements of the EDM system, including the servomechanism for maintaining the minimum gap spacing and for the recirculation of the dielectric medium are described in that application. The use of a formed sheet-metal body for sinking a cavity is described in application Ser. No. 723,799 filed Apr. 24, 1968 (U.S. Pat. No. 3,591,760 of July 6, 1971). The latter application describes and claims a method of making an electrode for the electrochemical machining or electric-discharge machining of a metallic workpiece by cavity sinking with a sheet-metal electrode of substantially uniform cross section and thickness which has been given the desired configuration by high-energy-rate forming in accordance with principles established in my U.S. Pat. Nos. 3,208,255 and 3,232,085 and further developed in then pending applications Ser. No. 508,487 (U.S. Pat. No. 3,512,384 filed May 19, 1970) and Ser. No. 574,056 (replaced by Ser. No. 64,104 now U.S. Pat. No. 3,663,788 of May 16, 1972).

In electrochemical machining, machining medium is a liquid electrolyte which is supplied at a relatively high velocity into machining gap while a strong undirectional electric current is applied between the machining electrode and the workpiece to anodically remove material from the latter. Electrochemical machining with a formed sheet-like electrode is also described in the above-identified application Ser. No. 723,799 (U.S. Pat. No. 3,591,760 of July 6, 1971). Furthermore, the electrochemical machining system may use the power supply and electrode control apparatus, as well as the electrolyte system, described and claimed in application Ser. No. 750,576 filed Aug. 6 1968 (U.S. Pat. No. 3,607,689 of Sept. 21, 1971). That application provides a system for electrochemical machining of large surfaces with the aid of a storage capacitor which is intermittently charged for delivering unidirectional machining pulses of greater amplitude than is available from the charging source. It has been indicated that a combined ECM and EDM process may be used and reference may be had to application Ser. No. 824,014 filed Aug. 30, 1968 (U.S. Pat. No. 3,594,299 of July 20 1971) in this connection.

Figure 6:
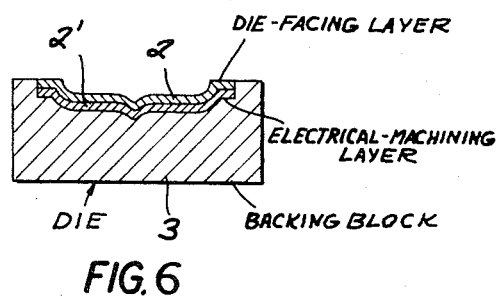
FIG. 6 is a sectional view illustrating a resulting integrated die structure.

As material is removed from conductive block 3, the latter and machining electrode 2/2' are relatively displaced so as to maintain constant the closest spacing of the gap therebetween. In electrical machining, substantial heat is developed in the machining region and may thermally deform or injure the sheet-form electrode 2/2'. To avoid such possibility, a coolant fluid as represented at 11 is preferably passed in contact with the reverseside surface 2a of the electrode. When the material-removed surface 3a of conductive block 3 and machining electrode surface 2'a become finally complementary to each other, the machining operation is terminated. Finally, by bounding these machining surface 2'a and machined surface 3a together as matingly engaged, a unitary or integrated die structure results as shown in FIG. 6. The bonding can be effected in a conventional manner such as using studs, adhesive, brazing or soldering in joining the two bodies.

It will be noted that the integrated die has a surface 2a with a shaped outline which closely duplicates die master contour 1a, the surface layer 2/2' being firmly supported by backing member 3' thus prepared. The exceeding accuracy of the duplication, smoothness of the shaped die surface, and the excellent firmness of die structure are here manifest. Turning back to the step of forming die-surface layer 2 (FIG. 3), it will be noted that the outer surface 2b of this layer can be of a rough form since it does not govern accuracy of finished die surface and hence a conventional plating technique, which has been not reliable in this field die to accuracy problems, can be used advantageously without trouble. For the outer surface 2'a of electrode layer 2', formed where desirable, the same advantage applied as well. Electrical machining thus provides a pair of closely matable readily, possible wear of machining electrode notwithstanding, by virtue of the fact that machining proceeds preferentially across the closest minutes gap between juxtaposed surfaces.

Figure 7:
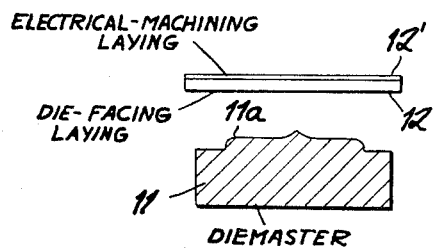
FIG. 7 is a sectional view illustrating a master die and a laminated sheet which consists of two layers composed of material selected to constitute the surface layer of a resulting die and an electrode material, respectively.
Figure 8:
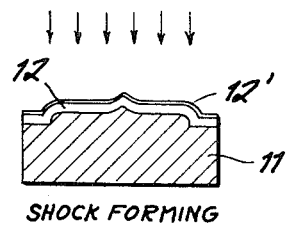
FIG. 8 is a sectional view illustrating the step of forming the laminated sheet against the master die using an impact forming technique.

FIGS. 7 and 8 show diagrammatically an alternative embodiment of the step of forming a die-surface layer in accordance with this invention. In this embodiment, the die-surface layer is formed from a sheet material 12 which is plastically deformable. Where desired for the reason mentioned previously, such a sheet material may have an electrode layer 12' electrodeposited thereon as shown. The layer 12 or laminated layer 12/12' is shaped against contoured surface 11a of die master 11 here by high-precision pressing, preferably, by impact-forming techniques. In impact forming, shockwaves or hydroimpact force is applied in the direction of arrow as shown to instantaneously shape the layer against the master die and is capable of accomplishing the required forming at a high precision with a single or several shots of the impact. While I prefer to use the shock-forming technique and apparatus described and claimed in application Ser. No. 723,799 filed Apr. 24 1968 (U.S. Pat. No. 3,591,760), shock-wave forming systems such as those described in applications Ser. Nos. 845,724 and 850,056 (U.S. Pat. No. 3,640,110 of Feb. 8 1972) may also be used. In the latter system, a jet of liquid is the forming means and has the shockwave or high-energy rate force superimposed thereon. Thence, the shaped layer is used to prepare a backing member therefor by electrical machining and bonded therewith in the manner set forth previously. Before proceeding to the electrical machining step, master die 11 may be removed from layer 12 or 12/12' shaped thereagainst, the shaped layer being then mounted on an electrical-machining apparatus as the machining electrode. As mentioned previously, a coolant fluid is here again preferably held in contact with the surface of the shaped layer opposite to that thereof which undergoes machining action. When the nature and material of master die 11 permits, the latter may remain to hold the shaped layer 12/12' and serve in part as its holder by being mounted on an electrical machining tool.

While the foregoing description of embodiments of the invention is made in connection with preparation of a bottomed cavity die, the present invention also is applicable for preparation of a through-cut die.

SPECIFIC EXAMPLE

A circular master of polystyrene having a diameter of 10 cm and the configuration shown in FIG. 1 of the drawing with a total contour hight of about 2 cm is to be used to form the die. Silver paint to a thickness of 0.5 micron is sprayed onto the surface of the die master, thereby rendering the surface conductive and chromium is electroplated to a thickness of 5 mm with a current density of 50 amp/dm$^2$ using an aqueous electrolyte containing 400 g/l chromic acid, and 4 g/l sulfate ion. The tank volume was in excess of 10 volts and fluosilicate brightener was supplied. Using the plastic article as a holder, i.e., without removing the chromium layer, a copper layer with a thickness of 5 mm was then applied in a bath containing 200 g/l copper sulfate, 60 g/l sulfuric acid and other conventional additives. The plating temperature was about 30°C and the current density about 30 am/ft$^2$.

The laminated body was then removed from the plastic article and the silver coating eliminated by electropolishing with the body as an anode in a conventional sulfuric acid/phosphoric acid solution with the weight ratio of 50:50 of the acids. The temperature was close to 90°C, the current density about 200 amp/ft$^2$ and the voltage was between 6 and 25 volts. Upon removal of the silver layer, the copper side of the laminate was used to electrically machine a steel block as described in the Example of application Ser. No. 824,014 (U.S. Pat. No. 3,594,299). The cavity sunk into the block, was then cleaned and the laminate inserted and brazed in place.

I claim:

1. A process of making a die comprising the steps of preparing a die master having a contoured surface complementary to that of the die to be produced, applying upon said contoured surface a layer with a forming surface in intimate contact with said contoured surface, said layer at least along the region of said forming surface consisting of a material selected to constitute the exposed surface of the die to be produced, thereafter electrically machining a conductive block with the opposite surface of said layer as a machining electrode to impart to said block a machined surface of a configuration complementary to that of said opposite surface to form a backing member, and bonding said machined surface and said opposite surface together in mating engagement thereby forming a unitary die with said exposed surface of said layer constituting the surface region of the die and said layer being supported by said backing member.

2. The process defined in claim 1 wherein said layer is applied upon said contoured surface by electrodeposition.

3. The process defined in claim 2 wherein said die master is composed of an electrically conductive material and said layer is electrodeposited upon said contoured surface by juxtaposing the latter as one electrode and a counterelectrode in the presence of an electrolyte therebetween adapted to form said layer and passing an electrodeposition current between said electrodes through said electrolyte to cathodically build up said layer upon said contoured surface.

4. The process defined in claim 2 wherein said die master is composed of electrically nonconductive material, said layer being electrodeposited upon said contoured surface by initially forming a thin film of electrically conductive material thereon adapted to constitute a cathode of an electrolytic deposition system, juxtaposing said film and a counterelectrode as anode in the presence of an electrolyte therebetween adapted to form said layer and passing an electrolytic deposition current between said film and said counterelectrode to cathodically build up said layer.

5. The process defined in claim 3 wherein said die master is composed of a material selected from the group which consists of graphite and a metal.

6. The process defined in claim 4 wherein said the master is composed of a material selected from the group which consists of a wood, gypsum and plastic.

7. The process defined in claim 1, wherein said layer applied upon said contoured surface comprises two sublayers, of which one adjacent to said contoured surface consists of a material selected to constitute the forming surface and the other consists of an electrode material adapted for use as said machining electrode.

8. The process defined in claim 7 wherein said electrode material is selected to undergo a minimum amount of electrical erosion during electrical machining of said block.

9. The process defined in claim 1 wherein said layer is applied upon said contoured surface by impact-forming a plastically deformable sheet material against said contoured surface.

10. The process defined in claim 9 wherein said layer applied upon said contoured surface comprises two sublayers, of which one adjacent to said contoured surface consists of a material selected to constitute the forming surface and the other consists of an electrode material adapted for use as said machining electrode surface.

11. The process defined in claim 1 wherein said electrical machining is electrical-discharge machining.

12. The process defined in claim 1 wherein said electrical machining is electrochemical machining.

13. The process defined in claim 1 wherein said die master forms a part of an electrode holder for the formed layer as the latter is used as said machining electrode, and said die master is removed from the formed layer after preparation of said backing member by electrical machining.

14. The process defined in claim 1 wherein said die master is removed from said formed layer before the electrical machining therewith.

15. The process defined in claim 1 wherein a fluid coolant is held in contact with said formed layer along the surface opposite to that used as said machining electrode surface.

* * * * *